United States Patent
Webb

(10) Patent No.: US 9,822,821 B2
(45) Date of Patent: Nov. 21, 2017

(54) ROTATING SHAFT COUPLING ASSEMBLY

(75) Inventor: Scot Webb, Gales Ferry, CT (US)

(73) Assignee: United Technologies Corporation, Farmington, CT (US)

( * ) Notice: Subject to any disclaimer, the term of this patent is extended or adjusted under 35 U.S.C. 154(b) by 2852 days.

(21) Appl. No.: 11/521,861

(22) Filed: Sep. 15, 2006

(65) Prior Publication Data

US 2007/0014629 A1    Jan. 18, 2007

Related U.S. Application Data

(62) Division of application No. 11/140,788, filed on May 31, 2005.

(51) Int. Cl.
*F16L 23/00* (2006.01)
*F16D 1/04* (2006.01)

(52) U.S. Cl.
CPC ............... *F16D 1/04* (2013.01); *Y10T 403/50* (2015.01); *Y10T 403/66* (2015.01)

(58) Field of Classification Search
USPC ... 403/28–30, 273, 293, 292, 341, 345, 362, 403/408.1; 285/187, 381.1, 381.2, 381.3, 285/923; 138/97–99; 464/182, 183; 415/216.1; 416/244 A
See application file for complete search history.

(56) References Cited

U.S. PATENT DOCUMENTS

| | | | |
|---|---|---|---|
| 4,238,539 A * | 12/1980 | Yates et al. | 428/35.9 |
| 4,715,739 A * | 12/1987 | Ruegg et al. | 403/30 |
| 4,844,647 A * | 7/1989 | Schulz | 403/24 |
| 4,862,736 A * | 9/1989 | Treitz | 73/117 |
| 4,930,204 A * | 6/1990 | Schurter | 29/419.2 |
| 5,026,098 A * | 6/1991 | Schmid | 285/148.13 |
| 5,143,477 A * | 9/1992 | Kanehira et al. | 403/341 |
| 5,176,406 A * | 1/1993 | Straghan | 285/24 |
| 5,277,435 A * | 1/1994 | Kramer et al. | 279/9.1 |
| 5,665,187 A * | 9/1997 | Mackellar | 156/91 |
| 5,852,949 A * | 12/1998 | Cartensen | 74/424.94 |
| 6,062,116 A * | 5/2000 | Morioka et al. | 82/1.11 |
| 6,375,381 B1 * | 4/2002 | Ruschke et al. | 403/282 |
| 6,520,547 B2 * | 2/2003 | Robinson | 285/330 |

(Continued)

FOREIGN PATENT DOCUMENTS

GB    2203791 A  * 10/1988 ............... F16B 2/20

OTHER PUBLICATIONS

Azom.com, "Shape Memory Alloys—Frequently Asked Questions", Jun. 18, 2007.

(Continued)

*Primary Examiner* — Abigail Troy
*Assistant Examiner* — Nahid Amiri
(74) *Attorney, Agent, or Firm* — Carlson, Gaskey & Olds, P.C.

(57) ABSTRACT

A rotating shaft coupling assembly includes a first rotating shaft defining a step at a longitudinal end. A second rotating shaft has a longitudinal end to be received against the step of the first rotating shaft such that the first and second rotating shafts form an overlapping portion. A coupler sleeve including a shape memory alloy is disposed about at least the overlapping portion of the first and second rotating shafts to couple the shafts together.

17 Claims, 1 Drawing Sheet

(56) References Cited

U.S. PATENT DOCUMENTS 6,637,110 B2 * 10/2003 Jee ........................ 29/890.031
7,004,671 B2 * 2/2006 Tawara et al. ............ 403/341

OTHER PUBLICATIONS

Answers.com, "Shape Memory Alloy", Sep. 6, 2006.
Intrinsic Devices Incorporated—UniLok®, "A Revolution in Fastening, Sealing and Electrical Interconnection".
Intrinsic Devices Incorporated, "Product Configurations", p. 1.
Intrinsic Devices Incorporated, "UniLok® Applications", p. 4.

* cited by examiner

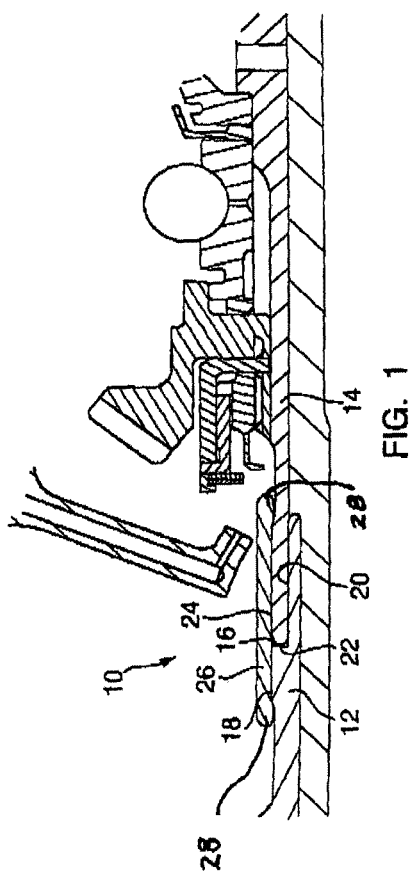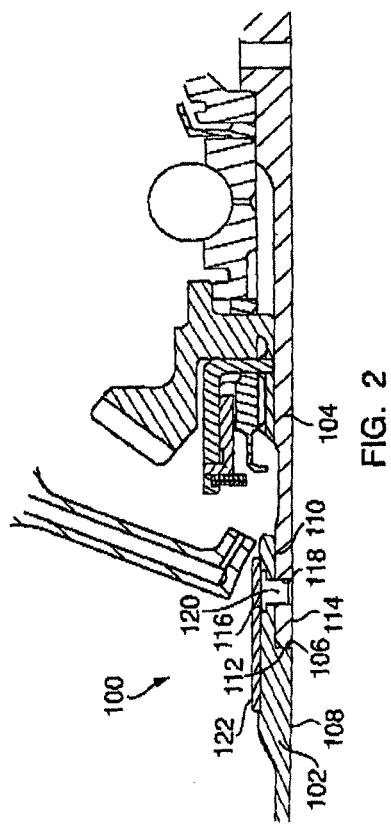

ROTATING SHAFT COUPLING ASSEMBLY

CROSS REFERENCE TO RELATED APPLICATION

This application is a Divisional Application of U.S. Ser. No. 11/140,788 entitled "Rotating Shaft Coupling Assembly", filed on May 31, 2005, and claims the benefit of the filing date thereof.

FIELD OF THE INVENTION

This invention relates generally to a rotating shaft coupling assembly, and more particularly to a rotating shaft coupling assembly including a shape memory alloy.

BACKGROUND OF THE INVENTION

The traditional method for rigidly coupling two shafts is to use a spline that is piloted on both ends or a threaded connection that has two piloting surfaces. The purpose of the piloting features (generally either two diameters or a diameter plus a shoulder) is to ensure that the coupling maintains concentricity and colinearity of the two shaft axes. This technique for shaft coupling requires that the mating shaft ends are designed and machined specifically for the coupling function.

In the situation where a rigid coupling is to be made to a shaft end that is not specifically designed for the coupling, there are several methods available. The most popular include:
1) Simple press fit;
2) Press fit with a clamping collar; or
3) Tapered compression coupling such as Ringfeder Corp. LOCKING ELEMENTS™ or Fenner Mannheim TRANTORQUE® coupling.

For high-speed applications the coupling must be able to maintain a reasonable balance of the assembly, which tends to exclude the clamping collar devices. Aerospace requirements favor small size, high reliability and robust design. The TRANTORQUE® couplings are robust but not small; whereas the simple press fit is small but not robust.

Accordingly, it is an object of the present invention to provide a rotating shaft coupling that overcomes the above-mentioned drawbacks and disadvantages.

SUMMARY OF THE INVENTION

In an aspect of the present invention, a rotating shaft coupling assembly includes a first rotating shaft defining a step at a longitudinal end. A second rotating shaft has a longitudinal end to be received against the step of the first rotating shaft such that the first and second rotating shafts form an overlapping portion. A coupler sleeve fabricated from a shape memory alloy is disposed about at least the overlapping portion of the first and second rotating shafts to couple the shafts together.

BRIEF DESCRIPTION OF THE DRAWINGS

FIG. 1 is a cross-sectional, side elevation view of a rotating shaft coupling assembly in accordance with a first embodiment of the present invention.

FIG. 2 is a cross-sectional, side elevation view of a rotating shaft coupling assembly in accordance with a second embodiment of the present invention.

DETAILED DESCRIPTION OF THE PREFERRED EMBODIMENTS

With reference to FIG. 1, a rotating shaft coupling assembly in accordance with a first embodiment of the present invention is indicated generally by the reference number 10. The assembly can be used in, for example, gas turbine engines, but is not limited in this regard. The assembly 10 includes a first rotating shaft 12 and a second rotating shaft 14 to be coupled together. In gas turbine engine applications, the first rotating shaft 12 can be, for example, an integrated starter/generator (ISG) shaft fabricated from a durable alloy such as INCOLOY A-286® (an age hardenable iron-nickel-chromium alloy) or INCONEL 718® (a flowformed nickel-base superalloy). The second rotating shaft 14 can be, for example, a high pressure compressor (HPC) tie bolt fabricated from a durable alloy such as INCOLOY 909® (a nickel-cobalt-iron alloy).

As shown in FIG. 1, the first rotating shaft 12 defines a shoulder or step 16 so as to form a first step surface 18 on one side of the step 16 and a second step surface 20 on the other side of the step. A longitudinal end 22 of the second rotating shaft 14 is abutted against the second step surface 20 and the shoulder or step 16 such that an outer surface 24 of the second rotating shaft adjacent to the step is generally flush with the first step surface 18 of the first rotating shaft 12 adjacent to the step. For a traditional press fit connection, the first rotating shaft 12 and the second rotating shaft 14 would be coupled via a radial interference fit at the second step surface 20. The present invention has a radial clearance at the second step surface 20, such that the rotating shafts 12, 14 can readily be assembled and subsequently positioned.

A coupler sleeve 26 fabricated from a shape memory alloy (SMA) is disposed about at least portions of the first and second rotating shafts 12, 14 which overlap one another adjacent to the shoulder or step 16, As installed, the coupler sleeve 26 has been expanded by plastic deformation while in the weak phase (martensite, for TINEL® alloys), and has been stored below the transformation temperature until installation in the coupling. When the coupler sleeve 26 has been properly positioned during installation, it is heated to a temperature greater than the transformation temperature causing the SMA material to transform to the strong phase (austenite, for TINEL® alloys). This transformation causes the coupler sleeve 26 to return to its original dimensions if unrestrained, that being of a smaller diameter than the outer diameter of the first rotating shaft 12 and the second rotating shaft 14. The resulting dimension of the coupler sleeve 26 results in a radial interference fit between the coupler sleeve and the rotating shafts 12, 14, and also a radial interference fit between the first rotating Shaft 12 and the second rotating shaft 14 at the second step surface 20. It is the interference fit at the second step surface 20 that determines the alignment of the rotating shafts 12, 14, and determines the friction to transmit torque from one shaft to the other. The coupler sleeve 26 being an SMA material can be similar to a CRYOFIT® coupling including a TINEL® Alloy per MEPS-6151 available from Aerofit Products, Inc. Coupler sleeve 26 may include circumferential ribs 28 at the interior portions of the ends thereof, which fit into corresponding recesses in the shafts for axial location and retention of the coupler sleeve relative to the first and second shafts.

The present invention embodied in FIG. 1 presents an alternative to creating a rigid coupling to an existing shaft that is both small, robust and maintains a reasonable balance. The fundamental basis for the coupling as shown in FIG. 1 uses the principle of press fit, but incorporates the coupler sleeve fabricated from a shape memory alloy to be able to generate the interference fit, and hence a significantly more robust coupling that is relatively easy to assemble. As shown in FIG. 1, the piloting is controlled by a diameter and a shoulder, and the axial retention and torque transmission are maintained via friction and an over the shoulder feature similar to the lip on a coffee can lid or TUPPERWARE® container.

With reference to FIG. 2, a rotating shaft coupling assembly in accordance with a second embodiment of the present invention is indicated generally by the reference number 100. The assembly 100 includes a first rotating shaft 102 and a second rotating shaft 104 to be coupled together. In gas turbine engine applications, the first rotating shaft 102 can be, for example, an ISG shaft fabricated from a durable alloy such as a GREEK ASCOLOY™ (a chromium-nickel-tungsten martensitic alloy) or Inconel 718. The second rotating shaft 104 can be, for example, an HPC tie bolt fabricated from a durable alloy such as INCOLOY 909®.

As shown in FIG. 2, the first rotating shaft 102 defines a shoulder or step 106 so as to form a first step surface 108 on one side of the step and a second step surface 110 on the other side of the step. A longitudinal end 112 of the second rotating shaft 104 is abutted against the second step surface 110 and the shoulder or step 106 such that an outer surface 114 of the second rotating shaft adjacent to the step is generally flush with the first step surface 108 of the first rotating shaft 102 adjacent to the step. At the assembly of the first rotating shaft 102 and the second rotating shaft 104, there is a radial clearance between the shafts at the second step surface 110.

The first rotating shaft 102 defines a first hole 116 extending therethrough, and the second rotating shaft 104 defines a second hole 118 extending therethrough. As shown in FIG. 2, when the shoulder 106 of the first rotating shaft 102 is abutted against the longitudinal end 112 of the second rotating shaft 104, the first hole 116 and the second hole 118 axially coincide with one another. A connector 120 such as, for example, a pin is received through the first and second holes 116, 118 to thereby secure the first and second rotating shafts 102, 104 to one another. Preferably, the holes 116, 118 are formed by a single drilling operation once the first and second rotating shafts 102, 104 are positioned together as described above. It is most effective to use a minimum of three pins 120 so that a bending moment along the axis of the rotating shafts 102, 104 can be transmitted, and the shafts will behave rigidly as a single shaft.

A coupler sleeve 122 fabricated from a shape memory alloy (SMA) is disposed about at least portions of the first and second rotating shafts 102, 104 which overlap one another adjacent to the shoulder or step 106 and is activated as described above to cause the radial clearance at the second step surface 110 to become an interference between the rotating shafts. The coupler sleeve 122 is also used to retain the pins 120 against centrifugal body forces caused by the rotation of the rotating shafts 102, 104. The coupler sleeve 122 fabricated from an SMA material can be similar to a CRYOFIT® coupling including a TINEL® Alloy per MEPS-6151 available from Aerofit Products, Inc.

The present invention embodied in FIG. 2 is a more robust embellishment of the coupling concept shown and described with respect to FIG. 1, wherein the press fit joint is inverted, and the torque and axial retention are maintained by shouldered pins that are inserted into holes machined after the shafts are assembled. In the embodiment shown in FIG. 2, the coupler sleeve 122 maintains the radial fit at the second step surface 110 and captures the pins 120.

In sum, the present invention creates structure to couple shafts in a robust and compact manner—specifically where there are no coupling features on an existing shaft. The present invention was conceived to couple a shaft extension to an existing shaft for the specific purpose unrelated to the coupling itself. However the present invention can also be applied to repair damaged features, or to avoid the precise machining associated with traditional shaft coupling techniques.

As will be recognized by those of ordinary skill in the pertinent art, numerous modifications and substitutions can be made to the above-described embodiment of the present invention without departing from the scope of the invention. Accordingly, the preceding portion of this specification is to be taken in an illustrative, as opposed to a limiting sense.

What is claimed is:

1. A rotating shaft coupling assembly comprising:
a first rotating shaft defining a step at a longitudinal end;
a second rotating shaft having a longitudinal end to be received against the step of the first rotating shaft such that the first and second rotating shafts form an overlapping portion;
a coupler sleeve fabricated from a shape memory alloy contracted to a strong phase by heat and disposed about at least the overlapping portion of the first and second rotating shafts to couple the shafts together wherein the first rotating shaft defines a first hole therethrough interiorly of said shape memory alloy coupler sleeve and the second rotating shaft defines a second hole therethrough interiorly of said shape memory alloy coupler sleeve such that the holes are axially aligned with one another for receiving a connector pin through the holes, wherein a portion of the shape memory alloy coupler sleeve is positioned radially outside the connector pin.

2. A rotating shaft coupling assembly as defined in claim 1, wherein the first rotating shaft is an integrated starter/generator shaft, and the second rotating shaft is a high pressure compressor shaft.

3. A rotating shaft coupling assembly as defined in claim 1, wherein the coupler sleeve is made from a nickel titanium shape memory alloy.

4. A rotating shaft coupling assembly as defined in claim 1, wherein the coupler sleeve is configured to retain the connector pin, and to ensure that a radial fit between the first and second rotating shafts is maintained.

5. A rotating shaft coupling assembly as defined in claim 1, wherein the coupler sleeve defines at least one circumferential rib for axis location and retention of the coupler sleeve relative to the first and second rotating shafts.

6. A rotating shaft coupling assembly as defined in claim 2, wherein the coupler sleeve defines at least one circumferential rib for axial location and retention of the coupler sleeve relative to the first and second rotating shafts.

7. A rotating shaft coupling assembly comprising:
a first rotating shaft defining a step at a longitudinal end;
a second rotating shaft having a longitudinal end to be received against the step of the first rotating shaft such that the first and second rotating shafts form an overlapping portion; and
a coupler sleeve fabricated from a shape memory alloy disposed about at least the overlapping portion of the first and second rotating shafts to couple the shafts together, wherein said coupler sleeve includes a pair of circumferential ribs disposed at the end portions of the interior of said sleeve, said ribs being received within recesses in said first and second shafts for the location and retention of the coupler sleeve relative thereto, wherein the first and second rotating shafts each comprise a metallic material.

8. A rotating shaft coupling assembly as defined in claim 1, wherein the shape memory alloy coupler sleeve is continuous across the entire area that is radially outside the first hole and the second hole.

9. A rotating shaft coupling assembly as defined in claim 1, wherein the first and second rotating shafts each comprise a metallic material.

10. A rotating shaft coupling assembly as defined in claim 1, wherein the first and second rotating shafts each comprise a nickel based alloy material.

11. A rotating shaft coupling assembly as defined in claim 1, wherein the connector pin is received within the holes such that a radially innermost face of at least one of the first or second rotating shafts is spaced radially inward from a radially innermost face of the connector pin.

12. A rotating shaft coupling assembly as defined in claim 1, wherein the first shaft is positioned radially between the second shaft and the coupler sleeve.

13. A rotating shaft coupling assembly as defined in claim 7, wherein the shape memory alloy coupler sleeve is continuous across the entire area that is radially outside the first hole and the second hole.

14. A rotating shaft coupling assembly as defined in claim 7, wherein the first and second rotating shafts each comprise a nickel based alloy material.

15. A rotating shaft coupling assembly as defined in claim 7, wherein a portion of the shape memory alloy coupler sleeve is positioned radially outside the connector pin.

16. A rotating shaft coupling assembly comprising:
a first rotating shaft defining a step at a longitudinal end;
a second rotating shaft having a longitudinal end to be received within the first rotating shaft and against the step of the first rotating shaft such that the first and second rotating shafts form an overlapping portion with the first rotating shaft radially outside of the second rotating shaft in the overlapping portion;
a coupler sleeve fabricated from a shape memory alloy contracted to a strong phase by heat and disposed about at least the overlapping portion of the first and second rotating shafts to couple the shafts together wherein the first rotating shaft defines a first hole therethrough interiorly of said shape memory alloy coupler sleeve and the second rotating shaft defines a second hole therethrough interiorly of said shape memory alloy coupler sleeve such that the holes are axially aligned with one another for receiving a connector pin through the holes, wherein the first and second rotating shafts each comprise a nickel based alloy material.

17. A rotating shaft coupling assembly as defined in claim 16, wherein the shape memory alloy coupler sleeve is unapertured radially outside the first hole and the second hole.

* * * * *

UNITED STATES PATENT AND TRADEMARK OFFICE
CERTIFICATE OF CORRECTION

PATENT NO. : 9,822,821 B2  
APPLICATION NO. : 11/521861  
DATED : November 21, 2017  
INVENTOR(S) : Scot Webb Page 1 of 1

It is certified that error appears in the above-identified patent and that said Letters Patent is hereby corrected as shown below:

In the Claims

In Claim 13, Column 5, Lines 24-25; after "radially outside" replace "the first hole and the second hole" with --a first hole of the first rotating shaft and a second hole of the second rotating shaft--

In Claim 15, Column 6, Line 3; after "radially outside" replace "the connector pin" with --a connector pin--

Signed and Sealed this  
Tenth Day of July, 2018

Andrei Iancu  
*Director of the United States Patent and Trademark Office*